United States Patent Office 2,743,255
Patented Apr. 24, 1956

2,743,255

AMINE-MODIFIED THERMOPLASTIC PHENOL-ALDEHYDE RESINS AND METHOD OF MAKING SAME

Melvin De Groote, University City, Mo., assignor to Petrolite Corporation, Wilmington, Del., a corporation of Delaware No Drawing. Application December 19, 1952, Serial No. 327,053

14 Claims. (Cl. 260—45.1)

This invention is concerned with certain heat-stable oxyalkylation-susceptible resinous condensation products of (a) oxyalkylation-susceptible, fusible, non-oxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

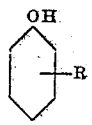

in which R is an aliphatic hydrocarbon radical having at least 4 carbon atoms and not more than 24 carbon atoms, and substituted in the 2,4,6 position; (b) substituted basic carbamyl compounds containing at least two cyclic amidine radicals; said cyclic amidines containing the radical of a 1,2-disubstituted heterocyclic of the structure

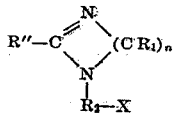

wherein R″ is a hydrocarbon radical containing from 7 to 31 carbon atoms; n is the numeral 2 to 3 inclusive; R₁ is a member of the class consisting of hydrogen atoms and lower alkyl radicals; R₂ is a member of the class consisting of alkylene radicals and lower alkyl substituted alkylene radicals; X is a member of the class consisting of amino radicals and amino alkylene-substituted amino radicals, with the proviso that there be at least one amino radical selected from the class of primary and secondary amino radicals; in said carbamyl compound, the aforementioned 1,2-disubstituted cyclic amidine radicals being united through amino nitrogens of the radicals X by at least one member of the class consisting of

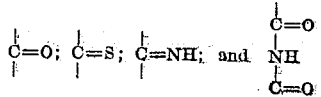

radicals; with the proviso that there be present in said substituted carbamyl compound at least one secondary amino radical and that said substituted carbamyl compound be free from any primary amino radical; and (c) formaldehyde; said condensation reaction being conducted at a temperature sufficiently high to eliminate water and below the pyrolytic point of the reactants and resultants of reaction.

Another aspect of the invention, of course, is the procedure employed for making such condensation products.

This invention in a more limited aspect relates to amine-modified thermoplastic phenol-aldehyde resins. For purpose of simplicity the invention may be exemplified by an idealized formula which may, in part, be an over-simplification in an effort to present certain resin structure. Such formula would be the following:

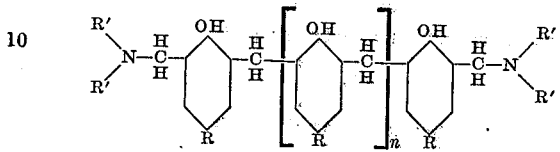

in which R represents an aliphatic hydrocarbon substituent generally having 4 and not over 18 carbon atoms but most preferably not over 14 carbon atoms, and n generally is a small whole number varying from 1 to 4. In the resin structure it is shown as being derived from formaldehyde although obviously other aldehydes are equally satisfactory.

The amine residue in the above structure is a carbamyl compound derived from either a substituted imidazoline or a substituted tetrahydropyrimidine as previously specified and subsequently described in greater detail, and may be indicated thus:

in which HN< represents a reactive secondary amino group and two occurrences of R' represent the remainder of the molecule.

Stated another way, what has been depicted in the above formula is an over-simplification as far as the ring compound is concerned which is obvious by reference to a more elaborate formula depicting the actual structure of typical members of the group, such as:

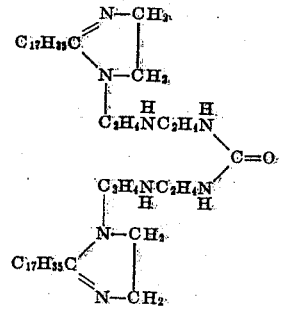

Restating what has been said previously, this invention is concerned with certain heat-stable oxyalkylation-susceptible resinous condensation products of (a) oxyalkylation-susceptible, fusible, non-oxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

in which R is an aliphatic hydrocarbon radical having at least 4 carbon atoms and not more than 24 carbon atoms and substituted in the 2,4,6 position; (b) a member of the class of compounds consisting of substituted carbamyl compounds containing at least 2 members selected from the class of substituted cyclic amidines; said cyclic amidines containing in turn members of the class of glyoxalidine radicals and tetrahydropyrimidine radicals of the structure

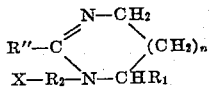

wherein $n$ is the terminal zero or one, and

is the residue of the acyl radical R″CO of a detergent-forming monocarboxy acid having at least 8 and not more than 32 carbon atoms; in which the residue

is obtained by elimination of the carbonyl oxygen atom from the acyl radical R″CO; $R_1$ is a member of the class consisting of hydrogen atoms and lower alkyl radicals; $R_2$ is a member of the class consisting of alkylene radicals and lower alkyl substituted alkylene radicals; X is a member of the class consisting of amino radicals and amino alkylene-substituted amino radicals, with the proviso that there be present at least one amino radical selected from the class of primary and secondary amino radicals; in said carbamyl compound, the aforementioned substituted cyclic amidine radicals being united through amino nitrogens of the radicals X; by at least one member selected from the class consisting of the

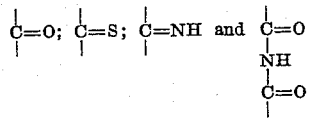

radicals; with the proviso that there be present in said substituted carbamyl compound at least one secondary amino radical and that said carbamyl compound be free from any primary amino radicals; and (c) formaldehyde; said condensation reaction being conducted at a temperature sufficiently high to eliminate water and below the pyrolytic point of the reactants and resultants of reaction.

Generally speaking, the carbamyl compounds are obtained by reaction between urea or the equivalent, and 2 moles of a substituted tetrahydropyrimidine, or 2 moles of a substituted glyoxalidine. Needless to say, one could conduct the reaction using one mole each of the two classes immediately described. If this were the case the cogeneric mixture obtained would, of course, include a substantial percentage of compounds in which one substituted cyclic amidine consist of a glyoxalidine derivative and the other a tetrahydropyrimidine derivative. This would be perfectly satisfactory for the herein described purpose but there is no advantage in employing this reactant.

The introduction of two such ring compound radicals into a comparatively small resin molecule, for instance, one having 3 to 6 phenolic nuclei as specified, alters the product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. R' also contains other groups, such as the carbamic acid residue and may, of course, contain a sulfur atom or other radicals. It is even possible that hydroxyl groups may be present which, needless to say, introduce a further hydrophile effect.

As far as I am aware such modified resins do not have any particular utility for the purpose where a thermoplastic or thermosetting phenol-aldehyde resin is ordinarily used, such as, for example, in coatings, but the products are valuable in various ways as hereinafter specified and particularly valuable as chemical reactants for further combination with chemical compounds, such as alkylene oxides or alkylating agents to produce quaternary ammonium compounds such as benzylchloride, esters of chloracetic acid, alkyl bromides, etc.

Combinations, resinous or otherwise, have been prepared from phenols, aldehydes, and reactive amines, particularly amines having secondary amino groups. Generally speaking, such materials have fallen into three classes; the first represents non-resinous combinations derived from phenols as such; the second class represents resins which are usually insoluble and used for the purpose for which ordinary resins, particularly thermosetting resins are adapted. The third class represents resins which are soluble as initially prepared but are not heat-stable, i. e., they are heat-convertible, which means they are not particularly suited as raw materials for subsequent chemical reaction which requires temperatures above the boiling point of water or thereabouts.

As to the preparation of the first class, i. e., non-resinous materials obtained from phenols, aldehydes and amines, particularly secondary amines, see United States Patents Nos. 2,218,739 dated October 22, 1940, to Bruson; 2,033,092 dated March 3, 1936 to Bruson; and 2,036,916 dated April 7, 1936, to Bruson.

As to a procedure by which a resin is produced as such involving all three reactants and generally resulting in an insoluble resin, or in any event, a resin which becomes insoluble in presence of added formaldehyde or the like, see United States Patents Nos. 2,341,907, dated February 15, 1944, to Cheetham et al.; 2,122,433, dated July 5, 1938, to Meigs; 2,168,335, dated August 8, 1939, to Heckert; 2,098,869, dated November 9, 1937, to Harmon et al.; and 2,211,960, dated August 20, 1940, to Meigs.

A third class of material which approaches the closest to the herein-described derivatives or resinous amino derivatives is described in U. S. Patent No. 2,031,557, dated February 18, 1936, to Bruson. The procedure described in said Bruson patent apparently is concerned with the use of monoamines only.

The resins employed as raw materials in the instant procedure are characterized by the presence of an aliphatic radical in the ortho or para position, i. e., the phenols themselves are difunctional phenols. This is a differentiation from the resins described in the aforementioned Bruson patent, No. 2,031,557, insofar that said patent discloses suitable resins obtained from metasubstituted phenols, hydroxybenzene, resorcinol, p,p'(dihydroxydiphenyl)dimethylmethane, and the like, all of which have at least three points of reaction per phenolic nuclei and as a result can yield resins which may be at least incipiently cross-linked even though they are apparently still soluble in oxygenated organic solvents or else are heat-reactive insofar that they may approach insolubility or become insoluble due to the effect of heat, or added formaldehyde, or both.

The resins herein employed contain only two terminal groups which are reactive to formaldehyde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one can prepare at least some in which the resins, instead of having only two points of reaction can have three, and possibly more points of reaction, with formaldehyde, or any other reactant which tends to form a methylol or substituted methylol group.

Apparently there is no similar limitation in regard to the resins employed in the aforementioned Bruson Patent 2,031,557, for the reason that one may prepare suitable resins from phenols of the kind already specified which invariably and inevitably would yield a resin having a functionality greater than two in the ultimate resin molecule.

The resins herein employed are soluble in a non-oxygenated hydrocarbon solvent, such as benzene or xylene. As pointed out in the aforementioned Bruson Patent 2,031,557, one of the objectives is to convert the phenol-aldehyde resins employed as raw materials in such a way as to render them hydrocarbon soluble, i. e., soluble in benzene. The original resins of U. S. Patent 2,031,557 are selected on the basis of solubility in an oxygenated inert organic solvent, such as alcohol or dioxane. It is immaterial whether the resins here employed are soluble in dioxane or alcohol, but they must be soluble in benzene.

The resins herein employed as raw materials must be comparatively low molal products having on the average 3 to 6 nuclei per resin molecule. The resins employed in the aforementioned U. S. Patent No. 2,031,557, apparently need not meet any such limitations.

The condensation products here obtained, whether in the form of the free base or the salt, do not go over to the insoluble stage on heating. This apparently is not true of the materials described in aforementioned Bruson Patent 2,031,557 and apparently one of the objectives with which the invention is concerned, is to obtain a heat-convertible condensation product. The condensation product obtained according to the present invention is heat stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

Although these condensation products have been prepared primarily with the thought in mind that they are precursors for subsequent reaction, yet as such and without further reaction, they have definitely valuable properties and uses as hereinafter pointed out.

What has been said previously in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° to 150° C. If one were using resins of the kind described in U. S. Patent No. 2,031,557 it appears desirable and perhaps absolutely necessary that the temperature be kept relatively low, for instance, between 20° C. and 100° C., and more specifically at a temperature of 80° to 90° C. There is no such limitation in the condensation procedure herein described for reasons which are obvious in light of what has been said previously.

What is said above deserves further amplification at this point for the reason that it may shorten what is said subsequently in regard to the production of the herein described condensation products. As pointed out in the instant invention the resin selected is xylene or benzene soluble, which differentiates the resins from those employed in the aforementioned Bruson Patent No. 2,031,-557. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat-reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process is not intended to limit the method of order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

Having described the invention briefly and not necessarily in its most complete aspect, the text immediately following will be a more complete description with specific reference to reagents and the method of manufacture.

For convenience, the subsequent text will be divided into six parts:

Part 1 is concerned with the general structure of the amine-modified resin and also the resin itself, which is used as a raw material;

Part 2 is concerned with basic substituted imidazolines and substituted tetrahydropyrimidines which, after reaction with urea or the like, are characterized by freedom from any primary amino radical and have at least one basic amino radical which may or may not be part of the original amidine ring, or a substituent thereof as distinguished from a basic nitrogen atom supplied by the compound which furnishes the carbamyl bridge, such as urea.

Obviously at first glance it would seem the cyclic compound must be obtained from a polyamino compound having at least 3 nitrogen atoms, such as diethylene triamine, dipropylene triamine, etc. Reference immediately preceding to the propylene compound refers to the trimethylene compound, i. e., having 3 carbon atoms between the nitrogen atoms. Since the cyclic compound obtained from a diamine has only a residual secondary radical, it is obvious that subsequent reaction with urea, for example, would leave a molecule free from secondary nitrogen radicals and thus not be reactive towards formaldehyde. Actually this apparent limitation may be ignored for two reasons; in the first place the cyclic compound having only a secondary amino residue outside the ring can be reacted with an imine, such as ethylene imine, or propylene imine, to yield a new compound in which there is a primary amino group. Furthermore, instead of being reactive with urea one may use biuret and thus the divalent linking radical supplied, instead of being

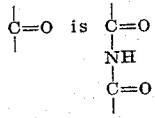

and in turn the secondary amino group is made available by means of a carbonic acid derivative. For this reason the text concerned with Part 2 includes cyclic amidines obtained with diamines; furthermore, Part 2 also contains a description of compounds which apparently have no secondary or even primary amino radical at all but have a hydroxyl radical such as 1-hydroxyethyl, 2-heptadecenyl glyoxalidine of the following structure:

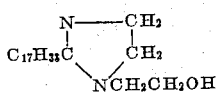

which, in turn, is obtained from hydroxyethyl ethylenediamine (2-aminoethylethanolamine).

Obviously such compound could be treated with an imine such as ethylene imine or propylene imine to yield a compound suitable for use as a reactant in the manner herein specified; or reaction could involve a compound of the type

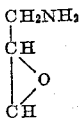

as described in U. S. Patent No. 1,985,885 dated January 1, 1935 to Bottoms.

Part 3 is a description of various compounds such as urea which may be used to unite or furnish a divalent radical connecting two cyclic amidine residues as previously noted;

Part 4 is concerned with the reaction involved in the method of making the herein described carbamyl compounds which are in essence carbonic acid amides of certain cyclic amidines. These carbonic acid derivatives, of course, are raw materials which ultimately are combined with formaldehyde and a phenol resin to yield the condensate referred to previously;

Part 5 is concerned with the reactions involving the resin, the basic ring compound, and formaldehyde, to produce the specific products or compounds which illustrate the present invention; and Part 6 is concerned with uses for the products described in Part 5, preceding.

PART 1

It is well known that one can readily purchase on the open market, or prepare, fusible, organic solvent-soluble, water-insoluble resin polymers of a composition approximated in an idealized form by the formula

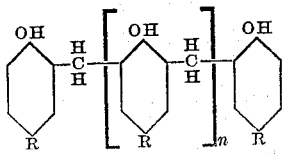

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance para-phenylphenol, one may obtain a resin which is not soluble in a nonoxygenated solvent, such as benzene, or xylene, but requires an oxygenated solvent such as a low molal alcohol, dioxane, or diethylglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368 dated March 7, 1950, to De Groote and Keiser. In said patent there are described oxyalkylation-susceptible, fusible, nonoxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

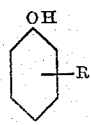

in which R is an aliphatic hydrocarbon radical having at least 4 carbon atoms and not more than 24 carbon atoms, and substituted in the 2, 4, 6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

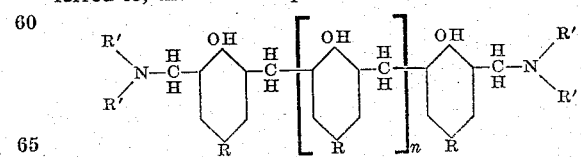

The basic amine may be designated thus:

subject to what has been said previously as to the presence of a substituted imidazoline or a substituted tetrahydropyrimidine radical having at least one basic secondary amine radical present and that the ring compound, or rather the two occurrences of R' jointly with n, be free from a primary amine radical. However, if one attempts to incorporate into the formula

a structure such as a substituted carbamyl compound containing at least 2 glyoxalidine radicals, or at least 2 tetrahydropyrimidine radicals as previously described, such as, for example, the following:

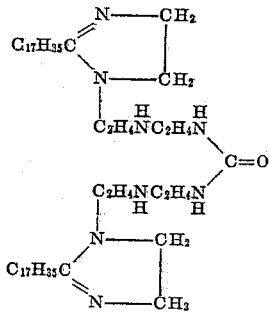

then one becomes involved in added difficulties in presenting an overall picture. Thus, for sake of simplicity the ring compound having the reactive secondary amino group will be depicted as

subject to the limitation and explanation previously noted.

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

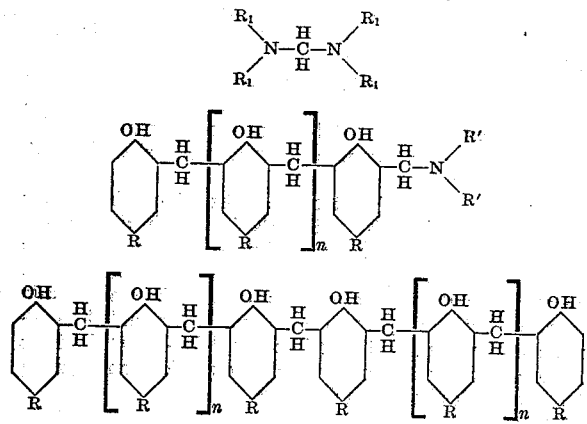

As has been pointed out previously, as far as the resin unit goes one can use a mole of aldehyde other than formaldehyde, such as acetaldehyde, propionaldehyde or butyraldehyde. The resin unit may be exemplified thus:

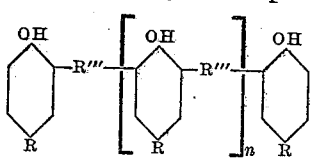

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for n as, for example, 3.5, 4.5, or 5.2.

In the actual manufacture of the resins I found no reason for using other than those which are lowest in price and most readily available commercially. For purposes of convenience suitable resins are characterized in the following table:

TABLE I

| Ex. No. | R | Position of R | R''' derived from— | n | Mol. wt. of resin molecule (based on n+2) |
|---|---|---|---|---|---|
| 1aa | Phenyl | Para | Formaldehyde | 3.5 | 992.5 |
| 2aa | Tertiary butyl | do | do | 3.5 | 882.5 |
| 3aa | Secondary butyl | Ortho | do | 3.5 | 882.5 |
| 4aa | Cyclohexyl | Para | do | 3.5 | 1,025.5 |
| 5aa | Tertiary amyl | do | do | 3.5 | 959.5 |
| 6aa | Mixed secondary and tertiary amyl. | Ortho | do | 3.5 | 805.5 |
| 7aa | Propyl | Para | do | 3.5 | 805.5 |
| 8aa | Tertiary hexyl | do | do | 3.5 | 1,036.5 |
| 9aa | Octyl | do | do | 3.5 | 1,190.5 |
| 10aa | Nonyl | do | do | 3.5 | 1,267.5 |
| 11aa | Decyl | do | do | 3.5 | 1,344.5 |
| 12aa | Dodecyl | do | do | 3.5 | 1,498.5 |
| 13aa | Tertiary butyl | do | Acetaldehyde | 3.5 | 945.5 |
| 14aa | Tertiary amyl | do | do | 3.5 | 1,022.5 |
| 15aa | Nonyl | do | do | 3.5 | 1,330.5 |
| 16aa | Tertiary butyl | do | Butyraldehyde | 3.5 | 1,071.5 |
| 17aa | Tertiary amyl | do | do | 3.5 | 1,148.5 |
| 18aa | Nonyl | do | do | 3.5 | 1,456.5 |
| 19aa | Tertiary butyl | do | Propionaldehyde. | 3.5 | 1,008.5 |
| 20aa | Tertiary amyl | do | do | 3.5 | 1,085.5 |
| 21aa | Nonyl | do | do | 3.5 | 1,393.5 |
| 22aa | Tertiary butyl | do | Formaldehyde | 4.2 | 996.6 |
| 23aa | Tertiary amyl | do | do | 4.2 | 1,083.4 |
| 24aa | Nonyl | do | do | 4.2 | 1,430.6 |
| 25aa | Tertiary butyl | do | do | 4.8 | 1,094.4 |
| 26aa | Tertiary amyl | do | do | 4.8 | 1,189.6 |
| 27aa | Nonyl | do | do | 4.8 | 1,570.4 |
| 28aa | Tertiary amyl | do | do | 1.5 | 604.0 |
| 29aa | Cyclohexyl | do | do | 1.5 | 646.0 |
| 30aa | Hexyl | do | do | 1.5 | 653.0 |
| 31aa | do | do | Acetaldehyde | 1.5 | 688.0 |
| 32aa | Octyl | do | do | 1.5 | 786.0 |
| 33aa | Nonyl | do | do | 1.5 | 835.0 |
| 34aa | Octyl | do | Butyraldehyde | 2.0 | 986.0 |
| 35aa | Nonyl | do | do | 2.0 | 1,028.0 |
| 36aa | Amyl | do | do | 2.0 | 860.0 |
| 37aa | Butyl | do | Formaldehyde | 2.0 | 636.0 |
| 38aa | Amyl | do | do | 2.0 | 692.0 |
| 39aa | Hexyl | do | do | 2.0 | 748.0 |
| 40aa | Cyclohexyl | do | do | 2.0 | 740.0 |

PART 2

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms which complete the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are sometimes characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as polycarboxy acids.

Cyclic amidines obtained from oxidized wax acids are described in detail in co-pending Blair application, Serial No. 274,075, filed February 28, 1952. Instead of being derived from oxidized wax acids, the cyclic compounds herein employed may be obtained from any acid from acetic acid upward, and may be obtained from acids such as benzoic, or acids in which there is a recurring ether linkage in the acyl radical. In essence then, with this difference, said aforementioned co-pending Blair application, Serial No. 274,075, describes compounds of the following structure:

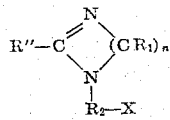

where, in the present instance, R″ is a hydrocarbon radical containing from 7 to 31 carbon atoms; $n$ is the numeral 2 to 3 inclusive; $R_1$ is a member of the class consisting of hydrogen atoms and lower alkyl radicals; $R_2$ is a member of the class consisting of alkylene radicals and lower alkyl substituted alkylene radicals; X is a member of the class consisting of amino radicals and alkylene-substituted amino radicals, with the proviso that there be at least one amino radical selected from the class of primary and secondary amino radicals.

For reasons which are obvious in light of the usual methods of manufacture, such compounds are apt to have present as a substituent a radical derived from a higher molecular weight carboxy acid, particularly a high molecular weight monocarboxy acid, and in particular the type of high molecular weight monocarboxy acid known as "monocarboxy detergent-forming acids." The expression "monocarboxy detergent-forming acids" has been used frequently in the literature to describe monocarboxy acids such as higher fatty acids, naphthenic acids, resin acids, and the like, which combine with caustic soda, caustic potash, of soluble bases, to produce soaps or materials having soap-like properties, i. e., detergents. The expression "detergent-forming monocarboxy acid" is used herein in the present sense.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure but can be included in the broad generic term previously indicated.

Among suitable acids may be mentioned straight chain and branched chain, saturated and unsaturated, carboxylic, aliphatic, alicyclic, fatty, aromatic, hydroaromatic, and aralkyl acids, including caprylic acid, heptylic acid, capric acid, pimelic acid, sebacic acid, erucic acid, saturated and unsaturated higher molecular weight aliphatic acids, such as the higher fatty acids containing at least 8 carbon atoms, and including in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloroacetylricinoleic acid, linoleic acid, linolenic acid, lauric acid, myristic acid, undecylenic acid, palmitic acid, cyclohexylbutyric acid, mixtures of any two or more of the above-mentioned acids or other acids, mixed higher fatty acids derived from animal or vegetable sources, for example, lard cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oil, teaseed oil, partially or completely hydrogenated animal and vegetable oils, such as those mentioned; hydroxy and alphahydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like, fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids, derived by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated polycarboxydiphenyl, naphthenic and abietic acid; aralkyl and aromatic acids, such as benzoic acid, Twitchell fatty acids, naphthoic acid, carboxydiphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorostearoic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

It is to be noted that the examples of suitable acids include hydroxy acids and acids in which the carbon atom chain of the acid may be interrupted by oxygen as in cetyloxyacetic acid and p-butylphenoxypropionic acid. Reference in the claims to the radical R in the formula above as being a hydrocarbon radical is intended to include also the radical R of the acid R—COOH where the latter may be a hydroxy acid or oxyacid such as given in the examples immediately above.

The preferred aspect of my invention is concerned with the use of compounds derived from detergent-forming monocarboxy acids, which include those previously described having at least 8 carbon atoms and not more than 32 carbon atoms. The preferred reagent in this particular case consists of the monocarboxy, detergent-forming acids and, more especially, the unsaturated, higher fatty acids having from 12 to 18 carbon atoms.

In the previous formula

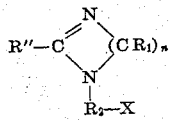

the monocarboxy acid having 8 to 32 carbon atoms, or thereabouts, furnishes the radical R" which, therefore, will contain 7 to 31 carbon atoms. The radical $R_1$ is a radical having comparatively few carbon atoms, for instance, 8 or less, generally being a lower alkyl radical having 1, 2 or 3 carbon atoms. Similarly, $R_2$ is a lower alkylene radical and generally ethylene or propylene are such radicals joined through the amino nitrogen atom, such as a diethylene amino radical, or the like.

In my preferred reagents, namely those derived from monocarboxy, detergent-forming acids, the radical R" will be the hydrocarbon radical of such acid, and, in the most preferred case, being derived from unsaturated fatty acids having from 12 to 18 carbon atoms, will contain from 11 to 17 carbon atoms.

The preparation of an imidazoline substituted in the two-position by aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylenediamine, diethylenetriamine, triethylenetetramine, tetraethylenepentamine, and higher polyethylene polyamines, and also including 1,2-diaminopropane, N-ethylethylenediamine, N,N-dibutyldiethylenetriamine, 1,2-diaminobutane, hydroxyethylethylenediamine, 1,2-propylenetriamine, and the like.

For details of the preparation of imidazolines substituted in the 2- position from amines of this type, see the following U. S. Patents: U. S. No. 1,999,989 dated April 30, 1935, to Max Bockmuhl et al.; U. S. No. 2,155,877 dated April 25, 1939, to Edmund Waldmann, et al.; and U. S. No. 2,155,878 dated April 25, 1939, Edmund Waldmann et al. Also see Chem. Rev., 32, 47 (43).

Equally suitable for use in the preparing compounds of my invention and for the preparation of tetrahydropyrimidines substituted in the 2-position are the polyamines containing at least one primary amino group and at least one secondary amino group, or another primary amino group separated from the first primary amino group by three carbon atoms. This reaction is generally carried out by heating the reactants to a temperature of 230° C. or higher, usually within the range of 250° C. to 300° C., at which temperatures water is evolved and ring closure is effected. For details of the preparation of tetrahydropyrimidines, see German Patent No. 700,371, dated December 18, 1940 to Edmund Waldmann and August Chwala; German Patent No. 701,322, dated January 14, 1941, to Karl Miescher, Ernst Urech and Wilfi Klarer; and U. S. Patent No. 2,194,419, dated March 19, 1940, to August Chwala.

Examples of amines suitable for this synthesis include 1,3-propylenediamine, trimethylenediamine, 1,3-diaminobutane, 2,4-diaminopentane, N-ethyl-trimethylenediamine, N - aminoethyltrimethyldiamine, aminopropyl stearylamine, tripropylenetetramine, tetrapropylenepentamine, high boiling polyamines prepared by the condensation of 1,3-propylene dichloride with ammonia, and similar diamines or polyamines in which there occurs at least one primary amino group separated from another primary or secondary amino group by three carbon atoms.

Examples of imidazolines which can be used as initial reactants in the preparation of the compounds contemplated in this invention, are listed in the following table:

TABLE II

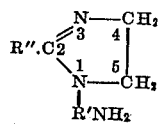

| Ex. No. | Name | R"— | —R'— |
|---|---|---|---|
| 1 | 1-aminoethyl, 2-heptadecylimidazoline | $C_{17}H_{35}$ | $C_2H_4$ |
| 2 | 1-diethylenediamino, 2-heptadecylimidazoline | $C_{17}H_{35}$ | $C_2H_4NC_2H_4$ / H |
| 3 | 1-triethylenetriamino, 2-heptadecylimidazoline | $C_{17}H_{35}$ | $C_2H_4NC_2H_4NC_2H_4$ / H H |
| 4 | 1-aminoethyl, 2-undecylimidazoline | $C_{11}H_{23}$ | $C_2H_4$ |
| 5 | 1-diethylenediamino, 2-undecylimidazoline | $C_{11}H_{23}$ | $C_2H_4NC_2H_4$ / H |
| 6 | 1-triethylenetriamino, 2-undecylimidazoline | $C_{11}H_{23}$ | $C_2H_4NC_2H_4NC_2H_4$ / H H |
| 7 | 1-aminoethyl, 2-pentadecylimidazoline | $C_{15}H_{31}$ | $C_2H_4$ |
| 8 | 1-diethylenediamino, 2-pentadecylimidazoline | $C_{15}H_{31}$ | $C_2H_4NC_2H_4$ / H |
| 9 | 1-triethylenetriamino, 2-pentadecylimidazoline | $C_{15}H_{31}$ | $C_2H_4NC_2H_4NC_2H_4$ / H H |
| 10 | 1-aminoethyl, 2-nonylimidazoline | $C_9H_{19}$ | $C_2H_4$ |
| 11 | 1-diethylenediamino, 2-nonylimidazoline | $C_9H_{19}$ | $C_2H_4NC_2H_4$ / H |
| 12 | 1-triethylenetriamino, 2-nonylimidazoline | $C_9H_{19}$ | $C_2H_4NC_2H_4NC_2H_4$ / H H |
| 13 | 1-aminoethyl, 2-heptadecylenylimidazoline | $C_{17}H_{33}$ | $C_2H_4$ |
| 14 | 1-diethylenediamino, 2-heptadecylenylimidazoline | $C_{17}H_{33}$ | $C_2H_4NC_2H_4$ / H |
| 15 | 1-triethylenetriamino, 2-heptadecylenylimidazoline | $C_{17}H_{33}$ | $C_2H_4NC_2H_4NC_2H_4$ / H H |
| 16 | 1-aminoethyl, 2-undecylenylimidazoline | $C_{11}H_{21}$ | $C_2H_4$ |
| 17 | 1-diethylenediamino, 2-undecylenylimidazoline | $C_{11}H_{21}$ | $C_2H_4NC_2H_4$ / H |
| 18 | 1-triethylenetriamino, 2-undecylenylimidazoline | $C_{11}H_{21}$ | $C_2H_4NC_2H_4NC_2H_4$ / H H |

TABLE II—Continued

| Ex. No. | Name | R''— | —R'— |
|---|---|---|---|
| 19 | 1-aminoethyl, 2-hydroxyheptadecylenylimidazoline | $OHC_{17}H_{33}$ | $C_2H_4$ |
| 20 | 1-diethylenediamino, 2-hydroxyheptadecylenylimidazoline | $OHC_{17}H_{33}$ | $C_2H_4\underset{H}{N}C_2H_4$ |
| 21 | 1-triethylenetriamino, 2-hydroxyheptadecylenylimidazoline | $OHC_{17}H_{33}$ | $C_2H_4\underset{H}{N}C_2H_4\underset{H}{N}C_2H_4$ |
| 22 | 1-aminoethyl, 2-abietylimidazoline | $C_{19}H_{29}$ | $C_2H_4$ |
| 23 | 1-diethylenediamino, 2-abietylimidazoline | $C_{19}H_{29}$ | $C_2H_4\underset{H}{N}C_2H_4$ |
| 24 | 1-triethylenetriamino, 2-abietylimidazoline | $C_{19}H_{29}$ | $C_2H_4\underset{H}{N}C_2H_4\underset{H}{N}C_2H_4$ |
| 25 | 1-aminoethyl, 2-cyclohexylethylimidazoline | $C_6H_{11}C_2H_4$ | $C_2H_4$ |
| 26 | 1-diethylenediamino, 2-cyclohexylethylimidazoline | $C_6H_{11}C_2H_4$ | $C_2H_4\underset{H}{N}C_2H_4$ |
| 27 | 1-triethylenetriamino, 2-cyclohexylethylimidazoline | $C_6H_{11}C_2H_4$ | $C_2H_4\underset{H}{N}C_2H_4\underset{H}{N}C_2H_4$ |
| 28 | 1-aminoethyl, 2-naphthenylimidazoline | (*) | $C_2H_4$ |
| 29 | 1-diethylenediamino, 2-naphthenylimidazoline | (*) | $C_2H_4\underset{H}{N}C_2H_4$ |
| 30 | 1-triethylenetriamino, 2-naphthenylimidazoline | (*) | $C_2H_4\underset{H}{N}C_2H_4\underset{H}{N}C_2H_4$ |

*R'' from naphthenic acid derived from a Gulf Coast crude having a molecular weight of 225.

A further list of substituted imidazolines which may be used in the preparation of the compounds contemplated in this invention is given in the following table:

TABLE III

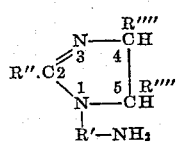

R'''' one occurrence being H, the other a lower alkyl group particularly $CH_3$

| Ex. No. | Name | R''— | —R'— |
|---|---|---|---|
| 1 | 1-aminopropyl, 2-heptadecyl(methyl*) imidazoline | $C_{17}H_{35}$ | $C_3H_6$ |
| 2 | 1-dipropylenediamino, 2-heptadecyl (methyl*) imidazoline | $C_{17}H_{35}$ | $C_3H_6\underset{H}{N}C_3H_6$ |
| 3 | 1-aminopropyl,2-heptadecylenyl(methyl*) imidazoline | $C_{17}H_{33}$ | $C_3H_6$ |
| 4 | 1-dipropylenediamino, 2-heptadecylenyl (methyl*) imidazoline | $C_{17}H_{33}$ | $C_3H_6\underset{H}{N}C_3H_6$ |
| 5 | 1-aminopropyl, 2-undecylenyl (methyl*) imidazoline | $C_{11}H_{21}$ | $C_3H_6$ |
| 6 | 1-dipropylenediamino, 2-undecylenyl (methyl*) imidazoline | $C_{11}H_{21}$ | $C_3H_6\underset{H}{N}C_3H_6$ |
| 7 | 1-aminopropyl, 2-abietyl(methyl*) imidazoline | $C_{19}H_{29}$ | $C_3H_6$ |
| 8 | 1-dipropylenediamino, 2-abietyl (methyl*) imidazoline | $C_{19}H_{29}$ | $C_3H_6\underset{H}{N}C_3H_6$ |
| 9 | 1-aminopropyl, 2-naphthenyl (methyl*) imidazoline | (**) | $C_3H_6$ |
| 10 | 1-dipropylenediamino, 2-naphthenyl (methyl*) imidazoline | (**) | $C_3H_6\underset{H}{N}C_3H_6$ |

*In 4 or 5 position.
**R'' from naphthenic acid derived from a Gulf Coast crude having a molecular weight of 225.

A list of tetrahydropyrimidines which may be used as initial reactants in the preparation of compounds contemplated in this invention is given in the following table:

TABLE IV

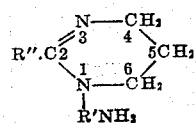

| Ex. No. | Name | R''— | —R'— |
|---|---|---|---|
| 1 | 1-aminoethyl, 2-heptadecyltetrahydropyrimidine | $C_{17}H_{35}$ | $C_2H_4$ |
| 2 | 1-aminopropyl, 2-heptadecyltetrahydropyrimidine | $C_{17}H_{35}$ | $C_3H_6$ |
| 3 | 1-dipropylenediamino, 2-heptadecyltetrahydropyrimidine | $C_{17}H_{35}$ | $C_3H_6\underset{H}{N}C_3H_6$ |
| 4 | 1-aminoethyl, 2-undecyltetrahydropyrimidine | $C_{11}H_{23}$ | $C_2H_4$ |
| 5 | 1-aminopropyl, 2-undecyltetrahydropyrimidine | $C_{11}H_{23}$ | $C_3H_6$ |
| 6 | 1-dipropylenediamino, 2-undecyltetrahydropyrimidine | $C_{11}H_{23}$ | $C_3H_6\underset{H}{N}C_3H_6$ |
| 7 | 1-aminoethyl, 2-decylenyltetrahydropyrimidine | $C_{11}H_{21}$ | $C_2H_4$ |
| 8 | 1-aminopropyl, 2-decylenyltetrahydropyrimidine | $C_{11}H_{21}$ | $C_3H_6$ |
| 9 | 1-dipropylenediamino, 2-decylenyltetrahydropyrimidine | $C_{11}H_{21}$ | $C_3H_6\underset{H}{N}C_3H_6$ |

PART 3

The carbamyl compounds described herein and suitable for use as condensate reactants may be synthesized in a number of ways. However, I find it generally most convenient to carry out the synthesis by reaction of an amino substituted cyclic amidine such as those described in Part 2 with a carbamyl compound or substituted carbamyl derivative, particularly a carbamyl amide, under conditions which lead to formation of a substituted carbamyl amide and production of a simple by-product such as ammonia.

Carbamyl compounds which are particularly useful in this synthesis include urea, thiourea, biuret, guanidine, biguanide, dicyandiamidine, and the like.

If we represent the amino substituted cyclic amidine by the formula A—NH$_2$, the preparation of the products of the present invention may be exemplified by the reaction between urea and two moles of amino substituted amidine as follows:

$$2A\text{—}NH_2 + NH_2\text{—}CO\text{—}NH_2 \rightarrow A\text{—}NH\text{—}CO\text{—}NH\text{—}A + 2NH_3$$

Where the amidine contains two or more primary or secondary amino groups, reaction with urea or similar carbamic acid derivatives appears to lead to some polymerization and the formation of products containing more than one heterocyclic group per molecule.

For a discussion of the reactions of urea with amino compounds see, e. g., "Sidgwicks' Organic Chemistry of Nitrogen," by Taylor and Baker, p. 289, Oxford University Press, 1937.

One of the two classes of carbamyl compounds, herein employed for the preparation of condensate, has been described in U. S. Patent No. 2,473,577, dated June 21, 1949 to De Groote and Keiser. The second class of carbamyl compound employed for the prevention of corrosion is described in co-pending application of Melvin De Groote, Serial No. 323,149 filed November 28, 1952.

As an example of a specific preparation of a product of the kind contemplated herein, the following is presented:

282 gms. of commercially pure, distilled oleic acid and 103 gms. of diethylene triamine were slowly mixed in a 1000 ml. flask equipped with stirrer, heater, thermometer, short distilling column and condenser. The temperature of the reactants was raised slowly and water was continuously distilled from the flask. After 3 hours the flask contents had been brought to 285° C. and approximately 35 gms. of water had been distilled from the flask. The product in the flask consisted largely of 2-heptadecenyl, 1-aminoethylimidazoline. At this point the flask was cooled, 30 gms. of urea were added to the product in the flask, and the distilling column was replaced by an exit tube connected to a gas-absorbing bottle containing 350 ml. of 3.53 N HCl solution. The contents were then heated and stirred for 4 hours, during which time the temperature was brought slowly to 220° C. Titration of the HCl absorbing solution indicated the absorption of 0.84 mole of ammonia, thus corresponding to an 84% yield of the compound

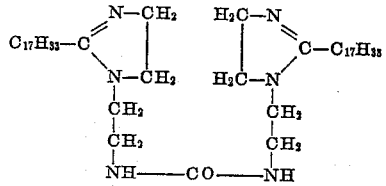

The product was a viscous, semi-crystalline syrup at room temperature. It formed a foaming, soap-like solution in dilute acetic acid.

PART 4

In the preparation of the herein contemplated compounds, 1,2-disubstituted cyclic amidines, as described in Part 1, are reacted with urea or its equivalents as described, and particularly outlined in Part 3.

Examples of compounds of the herein contemplated type can be represented in a generalized formula as follows:

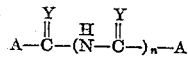

where A represents a 1,2-disubstituted cyclic amidine residue, as described in detail in Part 2, and coupled through the terminal amino or amino-alkylene substituted amino group on the "2" position of the ring; Y represents a member of the class consisting of divalent atoms or groups of atoms such as O, S, NH, etc.; and $n$ represents a numeral less than 10 and including zero. A variety of such contemplated structures are enumerated in the following table:

TABLE V

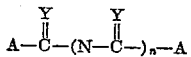

| Ex. No. | Where A is residue from Table IV | Y | $n$ | Coupling agent |
|---|---|---|---|---|
| 1b | Ex. 1a | Oxygen | 0 | Urea. |
| 2b | Ex. 2a | do | 1 | Biuret. |
| 3b | Ex. 3a | do | 0 | Urea. |
| 4b | Ex. 4a | NH | 0 | Guanidine carbonate. |
| 5b | Ex. 5a | Oxygen | 1 | Biuret. |
| 6b | Ex. 6a | do | 0 | Urea. |
| 7b | Ex. 7a | Sulfur | 0 | Thiourea. |
| 8b | Ex. 8a | Oxygen | 2 | Urea. |
| 9b | Ex. 9a | do | 1 | Biuret. |
| 10b | Ex. 10a | Sulfur | 0 | Thiourea. |

TABLE V—Continued

| Ex. No. | Where A is residue from Table I | Y | $n$ | Coupling agent |
|---|---|---|---|---|
| 11b | Ex. 1a | Oxygen | 0 | Urea. |
| 12b | Ex. 2a | do | 1 | Biuret. |
| 13b | Ex. 9a | NH | 0 | Guanidine carbonate. |
| 14b | Ex. 16a | Sulfur | 0 | Thiourea. |
| 15b | Ex. 17a | Oxygen | 0 | Urea. |
| 16b | Ex. 18a | do | 1 | Biuret. |
| 17b | Ex. 19a | Sulfur | 0 | Thiourea. |
| 18b | Ex. 25a | Oxygen | 0 | Urea. |
| 19b | Ex. 24a | Sulfur | 0 | Thiourea. |
| 20b | Ex. 28a | Oxygen | 0 | Urea. |

It has been previously pointed out that where urea is employed in the proportion of one mole of urea for 2 of the cyclic amidines, that the structure involves a linkage, such as the following:

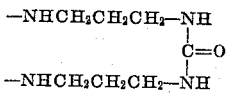

Whenever, however, 2 moles of urea are employed for two moles of the cyclic amidine, a variety of other structures may enter into the combination, as, for example, the formation of biuret, with the result that there appears a linkage such as the following:

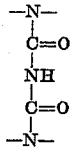

However, cyclic structures may be formed, due to the formation of 2 cross-linked structures, as indicated by the following:

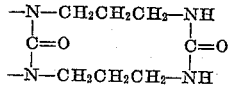

It is entirely possible, however, and seems indicated by some of the thick, resinous products formed, that polymerization occurs when the higher proportions of urea, or its equivalent, is employed, due to the formation of a structure, as indicated in the following manner:

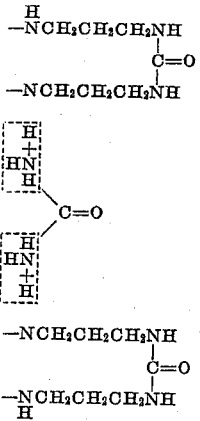

It will be noted that these structure diagrams have been drawn as though the cyclic amidine had been made from the successive amidification and dehydration of a higher fatty acid with a poly (1,3) propylene polyamine. Since these materials are readily obtained and easily handled they represent a logical and convenient method of attaining structures of the contemplated type.

In the case of cyclic amidines prepared by the successive amidification and dehydration of a higher fatty acid with a polyethylene polyamine the propylene chain in the preceding diagrams can be modified to the extent that such ethylene group is indicated rather than the propylene group as noted above. This substitution in no way affects the mechanism of course of the reaction. However, it should be noted that this is not intended to limit the scope of this invention but is included by way of example only. Besides the aforementioned specific structure, others of a homologous nature may be derived by the reaction of a fatty acid with a 1,3-diaminopropane and subsequent treatment of the monosubstituted cyclic amidine with ethylene amine, 1,2-propyleneimine, 1,3-propyleneimine, or their homologues to produce disubstituted cyclic amidines of the contemplated type.

As far as I am aware, the reaction involving two moles of the cyclic amidine and 1 mole of the urea involves the terminal primary amino radicals. When additional linkages may take place in more than one position, I am unaware as to the factors which determine the particular point of reaction.

It should be further pointed out that instead of any one particular cyclic amidine, a mixture of such cyclic amidines can be employed where the substituents on the heterocyclic ring are varied as illustrated previously. In such cases a mixture of products will result, the composition of which cannot be accurately predicted from the data at hand. For the purposes of this invention, as will be hereinafter enumerated, these mixtures are functionally equivalent to the unmixed reaction products described above.

PART 5

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethylene glycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a dark red in color or at least a red-amber, or some color which includes both an amber component and a reddish component. By and large, the melting point is apt to be lower and the products may be more sticky and more tacky than the original resin itself. Depending on the resin selected and on the amide selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation?; and the third factor is this, (c) is an effort to be made to purify the reaction mass by the usual procedure as, for example, a water-wash to remove the water-soluble unreacted formaldehyde, if any, or a water-wash to remove any unreacted water-soluble substituted amide, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction takes place principally at the interfaces, and the more vigorous the agitation the greater the interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the substituted carbamyl amide is added and stirred. Depending on the substituted carbamyl amide selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example, 35° C., or slightly lower, provided this initial low temperature stage is employed. The formaldehyde is then added in a suitable form. For reasons pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming take place, and other mechanical or chemical difficulties are involved. I have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10-24 hours, I then complete the reaction by raising the temperature up to 150° C., or thereabouts as required. The initial low temperature procedure can be eliminated or reduced to merely the shortest period of time which avoids loss of any reactant particularly formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C. and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the substituted carbamyl amide and 2 moles of formaldehyde. In some instances I have a trace of caustic as an added catalyst but have found no particular advantage in this. In other cases I have used a slight excess of formaldehyde and, again, have not found any particular advantage in this. In other cases I have used a slight excess of substituted carbamyl amide and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in some instances have checked whether or not the end-product showed surface-activity, particularly in a dilute acetic acid solution. The nitrogen content after removal of unreacted polyamine, if any is present, is another index.

In the hereto attached claims reference is made to the product as such, i. e., the anhydro base. Needless to say, the hydrated base, i. e., the material as it combines with water or the salt form, with a combination of suitable acids as noted, is essentially the same material but is merely another form and, thus, the claims are intended to cover all three forms, i. e., the anhydro base, the free base, and the salts.

In light of what has been said previously, little more need be said as to the actual procedure employed for the preparation of the herein described condensation products. The following example will serve by way of illustration:

*Example 1c*

The phenol-aldehyde resin is the one which has been previously identified as 2aa. It was obtained from a para-tertiary butyl phenol and formaldehyde. The resin was prepared using an acid catalyst which was completely neutralized at the end of the reaction. Although the actual molecular weight, based on a number of determinations, was 882.5 for the present purpose it was rounded off to 880. This corresponds to an average of about 3½ phenolic nuclei, as the value for $n$ which excludes the two external nuclei, i. e., the resin was largely a mixture having 3 nuclei and 4 nuclei, excluding the two external nuclei or 5 and 6 overall nuclei. The resin so obtained in a neutral state had a light amber color.

until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 16 examples in Table VI.

TABLE VI

| Ex. No. | Resin used | Amt. gms. (1 mole) | Carbamyl amide used and amt. (2 moles) | 37% formaldehyde (2 moles) (grams) | Xylene (grams) | Initial reaction temp., °C. | Reaction time (hrs.) | Max. distill. temp., °C. |
|---|---|---|---|---|---|---|---|---|
| 1c | 2aa | 880 | 1b ⎫ See Table V referring in turn to | 162 | 2,000 | 30–35 | 30 | 152 |
| 2c | 5aa | 960 | 1b ⎪ Table IV, Ex. 1a (2 moles) | 162 | 2,000 | 33–37 | 35 | 150 |
| 3c | 10aa | 1,270 | 1b ⎬ plus urea (1 mole) 1,512 gms. | 162 | 2,000 | 31–36 | 32 | 149 |
| 4c | 12aa | 1,500 | 1b ⎭ in each example. | 162 | 2,000 | 25–37 | 38 | 151 |
| 5c | 2aa | 880 | 3b ⎫ See Table V referring to turn to | 162 | 2,300 | 21–24 | 25 | 145 |
| 6c | 5aa | 960 | 3b ⎪ Table IV, Ex. 3a (2 moles) | 162 | 2,300 | 18–23 | 31 | 148 |
| 7c | 10aa | 1,270 | 3b ⎬ plus urea (1 mole) 1,796 gms. | 162 | 2,300 | 20–21 | 24 | 146 |
| 8c | 12aa | 1,500 | 3b ⎭ in each example. | 162 | 2,300 | 19–20 | 36 | 147 |
| 9c | 2aa | 880 | 11b ⎫ See Table V referring in turn to | 162 | 1,850 | 20–26 | 25 | 156 |
| 10c | 5aa | 960 | 11b ⎪ Table II, Ex. 1a (2 moles) | 162 | 1,850 | 22–30 | 32 | 145 |
| 11c | 10aa | 1,270 | 11b ⎬ plus urea (1 mole) 1,456 gms. | 162 | 2,000 | 20–24 | 30 | 148 |
| 12c | 12aa | 1,500 | 11b ⎭ in each example. | 162 | 2,100 | 23–28 | 31 | 149 |
| 13c | 2aa | 880 | 15b ⎫ See Table V referring in turn to | 162 | 2,250 | 20–26 | 35 | 146 |
| 14c | 5aa | 960 | 15b ⎪ Table II, Ex. 17a (2 moles) | 162 | 2,250 | 20–21 | 24 | 156 |
| 15c | 10aa | 1,270 | 15b ⎬ plus urea (1 mole) 1,284 gms. | 162 | 2,250 | 20–22 | 36 | 151 |
| 16c | 12aa | 1,500 | 15b ⎭ in each example. | 162 | 2,250 | 23–28 | 26 | 147 |

880 grams of the resin identified as 2aa, preceding, were powdered and mixed with approximately an equal weight (somewhat less than 1,000 grams) of xylene. The mixture was refluxed until solution was complete. It was then cooled to approximately 30° C. and two moles of the carbamyl amide compound identified as 1b (see Table V) was added. The mixture was stirred vigorously and then approximately two moles of formaldehyde, equivalent to 162 grams of 37% solution, added and then enough additional xylene to bring the total volume of xylene to approximately 2,000 grams. The mixture was stirred vigorously for about three hours and kept within a temperature range of about 30° to 45° C. for about 18 hours. At the end of this period of time it was refluxed, using a phase-separating trap and a small amount of aqueous distillate withdrawn from time to time, and the presence of unreacted formaldehyde noted. Any unreacted formaldehyde seemed to disappear within about four hours after the refluxing was started. As soon as the odor of formaldehyde was no longer detectible the phase-separating trap was set so as to eliminate all water of solution and reaction. After the water was eliminated part of the xylene was removed until the temperature reached approximately 150° C., or slightly higher. The mass was kept at this temperature for about five and one-half hours and the reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a tacky or solid resin. The overall time for the reaction was about 30 hours. In other examples it varied from 24 to 36 hours. This can be reduced by cutting the low temperature period to approximately 3 or 4 hours. When the final reaction was through enough xylene was added or distilled out to yield approximately a 50% solution.

Note that in Table VI following there are a large number of added examples illustrating the same procedure. In each case the initial mixture was stirred and held at a fairly low temperature (30° to 40° C.) for a period of several hours. Then refluxing was employed Needless to say, the materials described can be obtained in anhydrous form by distilling off the solvent such as xylene and preferably under vacuum. If desired the product can be decolorized using conventional procedures employing filtered earths, charcoals, or the like. For ordinary industrial purposes there is no reason to go to the added expense of decolorization.

Part 6

The products described in Part 5 have utility in at least two distinct ways—the products as such, or in the form of some simple derivative, such as the salt which can be used in numerous arts subsequently described. Also, the products can serve as initial materials for more complicated reactions of the kind previously mentioned, to wit, they may be subjected to oxyalkylation, particularly oxyethylation, or oxypropylation or oxybutylation to give products which are not only valuable for the purposes described in regard to the parent material or the salts of the parent material, but also for other purposes. Likewise, since the tertiary amino nitrogen atom is present the products can readily be reacted with suitable reactants such as chloroacetic acid esters, benzylchloride, alkyl halides, esters of sulfonic acids, dimethyl sulfate, or the like, to give quaternary ammonium compounds which are used, not only for the purposes herein described, but also for various other uses.

The products herein described as such and prepared in accordance with this invention can be used as emulsifying agents, for oils, fats, and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Other uses include the preparation or resolution of petroleum emulsions, whether of the water-in-oil type or oil-in-water type. They may be used as additives in connection with other emulsifying agents; they may be employed to contribute hydrotropic effects; they may be used as anti-strippers in connection with asphalts; they may be used to prevent corrosion, particularly the corrosion of ferrous metals for various purposes and particularly in connection with the production of oil and gas, and also in refineries where crude oil is converted into various commercial products. The products may be used industrially to inhibit or stop microorganic growth or other objectionable lower forms of life, such as the growth of algae, or the like; they may be used to inhibit the growth of bacteria, molds, etc.; they are valuable additives to lubricating oils, both those derived from petroleum and synthetic lubricating oils, and also to hydraulic brake fluids of the aqueous or non-aqueous type, some have definite anti-corrosive action; they may be used in connection with other processes where they are injected into an oil or gas well for purpose of removing a mud sheath, increasing the ultimate flow of fluid from the surrounding strata, and particularly in secondary recovery operations using aqueous flood waters. Such products are useful in dry cleaners' soaps.

With regard to the above statements, reference is made particularly to the use of the materials as such, or in the form of a salt; the salt form refers to a salt involving either one or both basic nitrogen atoms. Obviously, the salt form involves a modification in which the hydrophile character can either be increased or decreased and, inversely, the hydrophobe character can be decreased or increased. For example, neutralizing the product with practically any low molal acid, such as acetic acid, hydroxy acetic acid, lactic acid, or nitric acid, is apt to markedly increase the hydrophile effect. One may also use acids of the type

R—O—CH$_2$—CH$_2$—O—CH$_2$—
CH$_2$—O—CH$_2$—COOH in which R is a comparatively small alkyl radical, such as methyl, ethyl or propyl. The hydrophile effect may be decreased and the hydrophobe effect increased by neutralization with a monocarboxy detergent-forming acid. These are acids which have at least 8 and not more than 32 carbon atoms. They are obtained from higher fatty acids and include also resin acids such as abietic acid, and petroleum acids such as naphthenic acids and acids obtained by the oxidation of wax. One can also obtain new products having unique properties by combination with polybasic acids, such as diglycolic acid, oxalic acid, dimerized acids from linseed oil, etc. The most common examples, of course, are the higher fatty acids having generally 10 to 18 carbon atoms. I have found that a particularly valuable anti-corrosive agent can be obtained from any suitable resin and formaldehyde provided the secondary amine is dicyclohexylamine. The corrosion-inhibiting properties of this compound can be increased by neutralization with either one or two moles of an oil-soluble sulfonic acid, particularly a sulfonic acid of the type known as mahogany sulfonic acid.

The oil-soluble sulfonic acids previously referred to may be synthetically derived by sulfonating olefins, aliphatic fatty acids, or their esters, alkylated aromatics or their hydroxyl derivatives, partially hydrogenated aromatics, etc., with sulfuric acid or other sulfonating agents. However, the soaps of so-called mahogany acids which are usually produced during treatment of lubricating oil distillates with concentrated sulfuric acid (85% or higher concentration) remain in the oil after settling out sludge. These sulfonic acids may be represented as

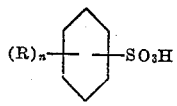

(where $n$ is a small whole number, especially 2 or 3)

where R is one or more alkyl, alkaryl or aralkyl groups and the aromatic nucleus may be a single or condensed ring or a partially hydrogenated ring. The lower molecular weight acids can be extracted from the acid-treated oil by adding a small amount of water, preferably after dilution of the oil with kerosene. However, the more desirable high molecular weight (350–500) acids, particularly those produced when treating petroleum distillates with fuming acid to produce white oil, are normally recovered as sodium soaps by neutralizing the acid oil with sodium hydroxide or carbonate and extracting with aqueous alcohol. The crude soap extract is first recovered as a water curd after removal of alcohol by distillation and a gravity separation of some of the contaminating salts (sodium carbonate, sulfates and sulfites). These materials still contain considerable quantities of salts and consequently are normally purified by addition of a more concentrated alcohol followed by storage to permit settling of salt brine. The alcohol and water are then stripped out and the sodium salts so obtained converted into free acids.

Not only can one obtain by-product sulfonic acids of the mahogany type which are perfectly satisfactory and within the molecular range of 300 to 600 but also one can obtain somewhat similar materials which are obtained as the principal product of reaction and have all the usual characteristics of normal by-product sulfonic acids but in some instances contain two sulfonic groups, i. e., are disulfonic acids. This type of mahogany acid or, better still, oil-soluble sulfonic acid, is perfectly satisfactory for the above described purpose.

Much of what has been said previously is concerned with derivatives in which the hydrophile properties are enhanced in comparison with the resin as such. A procedure designed primarily to enhance the hydrophobe properties of the resin involves derivatives obtained by a phenyl or substituted phenyl glycidyl ether of the structure

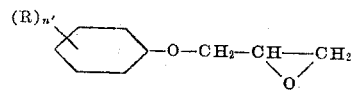

in which R represents a hydrocarbon substituent such as an alkyl radical having 1 to 24 carbon atoms, or a cyclic group, such as a cyclohexyl group, a phenyl group, or a benzyl group, and $n$ represents 0, 1, 2 or 3. $n$ is zero in the instance of the unsubstituted phenyl radical. Such compounds are in essence oxyalkylating agents and reaction involves the introduction of a hydrophobe group and the formation of an alkanol hydroxyl radical.

As far as the use of the herein described products goes for purpose of resolution of petroleum emulsions of the water-in-oil type, I particularly prefer to use those which as such or in the form of the free base or hydrate, i. e., combination of water or particularly in the form of a low molal organic acid such as the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethyl-ether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

The test described in U. S. Patent No. 2,499,368 is as follows: "The same is true in regard to the oxyalkylated resins herein specified, particularly in the lower stage of oxyalkylation, the so-called 'sub-surface-active' stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butyl-phenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i.e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion."

Having thus described my invention what I claim as new and desire to secure by Letters Patent, is

1. The process of condensing (a) oxyalkylation-susceptible, fusible, non-oxygenated-organic solvent-soluble, water-insoluble, low-stage phenol-aldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

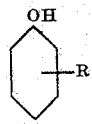

in which R is an aliphatic hydrocarbon radical having at least 4 carbon atoms and not more than 24 carbon atoms, and substituted in one of the positions ortho and para; (b) substituted basic carbamyl compounds containing at least two cyclic amidine radicals; said cyclic amidines containing the radical of a 1, 2-disubstituted heterocyclic of the structure

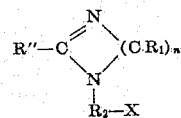

wherein $R''$ is a hydrocarbon radical containing from 7 to 31 carbon atoms; $n$ is the numeral 2 to 3 inclusive; $R_1$ is a member of the class consisting of hydrogen atoms and lower alkyl radicals; $R_2$ is a member of the class consisting of alkylene radicals and lower alkyl substituted alkylene radicals; X is a member of the class consisting of amino radicals and amino alkylene-substituted amino radicals, with the proviso that there be at least one amino radical selected from the class of primary and secondary amino radicals; in said carbamyl compound, the aforementioned 1,2-disubstituted cyclic amidine radicals being united by linkage of amino nitrogens of the radicals X to at least one member of the class consisting of

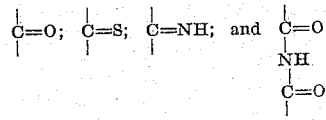

radicals; with the proviso that there be present in said substituted carbamyl compound at least one secondary amino radical and that said substituted carbamyl compound be free from any primary amino radical; and (c) formaldehyde; said condensation reaction being conducted at a temperature sufficiently high to eliminate water and below the pyrolytic point of the reactants and resultants of reaction.

2. The process of claim 1, wherein $R''$ is the radical of a higher fatty acid.

3. The process of claim 1, wherein $R''$ is the radical of a higher fatty acid having 18 carbon atoms.

4. The process of claim 1, wherein $R''$ is the radical of an unsaturated, higher fatty acid having 18 carbon atoms.

5. The process of claim 1, wherein $R''$ is the radical of an unsaturated, higher fatty acid having 18 carbon atoms and the ratio of cyclic amidine radicals to radicals selected from the class consisting of

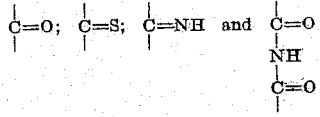

radicals being 2 to 1.

6. The process of claim 1 wherein R'' is the radical of an unsaturated, higher fatty acid having 18 carbon atoms; the ratio of cyclic amidine radicals to radicals selected from the class consisting of

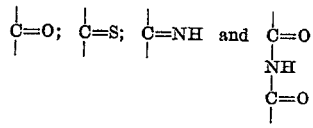

radicals being 2 to 1 and the number of nitrogen atoms in each cyclic amidine radical being 3.

7. The process of claim 1, wherein R'' is the radical of an unsaturated, higher fatty acid having 18 carbon atoms; the ratio of cyclic amidine radicals to radicals selected from the class consisting of

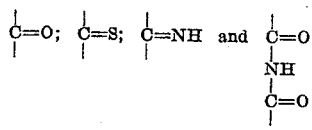

radicals being 2 to 1, and the number of nitrogen atoms in each cyclic amidine radical being 4.

8. The process of claim 1, wherein R'' is the radical of an unsaturated, higher fatty acid having 18 carbon atoms; the ratio of cyclic amidine radicals to radicals selected from the class consisting of

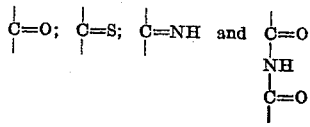

radicals being 2 to 1, and the number of nitrogen atoms in each cyclic amidine radical being 5.

9. The process of claim 1, wherein R'' is the radical of an unsaturated, higher fatty acid having 18 carbon atoms; the ratio of cyclic amidine radicals to divalent bridge radicals being 2 to 1 and the number of nitrogen atoms in each cyclic amidine radical being 5, with the final proviso that the divalent bridge radical be obtained from urea.

10. The process of claim 1, wherein R'' is the radical of an unsaturated, higher fatty acid having 18 carbon atoms; the ratio of cyclic amidine radicals to divalent bridge radicals being 2 to 1 and the number of nitrogen atoms in each cyclic amidine radical being 5, with the final proviso that the divalent bridge radical be obtained from thiourea.

11. The process of claim 1, wherein R'' is the radical of an unsaturated, higher fatty acid having 18 carbon atoms; the ratio of cyclic amidine radicals to divalent bridge radicals being 2 to 1 and the number of nitrogen atoms in each cyclic amidine radical being 5, with the final proviso that the divalent bridge radical be obtained from biuret.

12. The process of claim 1, wherein R'' is the radical of an unsaturated, higher fatty acid having 18 carbon atoms; the ratio of cyclic amidine radicals to divalent bridge radicals being 2 to 1 and the number of nitrogen atoms in each cyclic amidine radical being 5, with the final proviso that the divalent bridge radical be obtained from guanidine.

13. The process of claim 1, wherein R'' is the radical of an unsaturated, higher fatty acid having 18 carbon atoms; the ratio of cyclic amidine radicals to divalent bridge radicals being 2 to 1 and the number of nitrogen atoms in each cyclic amidine radical being 5, with the final proviso that the divalent bridge radical be obtained from biguanide.

14. The product resulting from the process defined in claim 1.

No references cited.